United States Patent
Beltman et al.

(10) Patent No.: US 7,914,839 B2
(45) Date of Patent: *Mar. 29, 2011

(54) COOKING FAT PRODUCT WITH IMPROVED SPATTERING BEHAVIOUR

(75) Inventors: Rob Beltman, Vlaardingen (NL); Robertus van der Brugghen, Vlaardingen (NL); Georg Christian Dol, Vlaardingen (NL); Sonja Fritsche, Kempten (DE)

(73) Assignee: Conopco, Inc., Englewood Cliffs, NJ (US)

( * ) Notice: Subject to any disclaimer, the term of this patent is extended or adjusted under 35 U.S.C. 154(b) by 721 days.

This patent is subject to a terminal disclaimer.

(21) Appl. No.: 10/582,600

(22) PCT Filed: Nov. 17, 2004

(86) PCT No.: PCT/EP2004/013056
§ 371 (c)(1),
(2), (4) Date: Feb. 7, 2008

(87) PCT Pub. No.: WO2005/058066
PCT Pub. Date: Jun. 30, 2005

(65) Prior Publication Data
US 2008/0305237 A1    Dec. 11, 2008

(30) Foreign Application Priority Data
Dec. 9, 2003    (EP) .................................. 03079070

(51) Int. Cl.
*A23D 7/00* (2006.01)
(52) U.S. Cl. ........................................ 426/602; 426/604
(58) Field of Classification Search .................. 426/602, 426/604, 629
See application file for complete search history.

(56) References Cited

U.S. PATENT DOCUMENTS

| | | | |
|---|---|---|---|
| 3,415,659 A | 12/1968 | Purves | |
| 3,946,122 A | 3/1976 | Scharp | |
| 4,399,165 A | 8/1983 | Tack et al. | |
| 5,436,021 A | 7/1995 | Bodor et al. | |
| 7,781,007 B2 * | 8/2010 | Beltman et al. | 426/604 |
| 2002/0142088 A1 | 10/2002 | Fabian et al. | |

FOREIGN PATENT DOCUMENTS

| | | |
|---|---|---|
| EP | 0 477 825 B1 | 4/1992 |
| EP | 0 771 531 B1 | 5/1997 |
| EP | 0 775 444 B1 | 5/1997 |
| GB | 378372 | 7/1932 |
| WO | 01/84945 A1 | 11/2001 |
| WO | 03/051136 A1 | 6/2003 |

OTHER PUBLICATIONS

Copending U.S. Appl. No. 10/582,281, filed Jun. 9, 2006, to Beltman et al.
International Search Report Application No. PCT/EP2004/013056 mailed Feb. 25, 2005.

* cited by examiner

*Primary Examiner* — Carolyn A Paden
(74) *Attorney, Agent, or Firm* — Michael P. Aronson

(57) ABSTRACT

Method for improving the spattering behavior of a cooking fat product containing 0-5 wt. % of a dispersed aqueous phase comprising the steps a. selecting a cooking fat product containing 0-5 wt. % of a dispersed aqueous phase, b. selecting fat insoluble vegetable matter having a consistency which allows milling to a powder, c. milling the vegetable matter to a powder having a volume weighted mean particle diameter ($d_{4,3}$) selected from the range 1-2000 & micro; m, admixing the resulting powder to the cooking fat product in an amount of 0.1-25 wt. % on product and getting it evenly dispersed throughout the product.

12 Claims, No Drawings

COOKING FAT PRODUCT WITH IMPROVED SPATTERING BEHAVIOUR

TECHNICAL FIELD

The invention relates to a method for improving the spattering behaviour of a cooking fat product when shallow frying food. Cooking fat products according to the present specification comprise cooking fats which do not contain a substantial amount of dispersed aqueous phase

BACKGROUND AND PRIOR ART

The use of a cooking fat product for frying often is accompanied by spattering. Spattering occurs when water or a water containing food product such as meat is brought in contact with a heated frying fat.

Spattering behaviour of a cooking fat product which contains no substantial amount of dispersed water, particularly of a cooking oil, is measured generally by determining its spattering value $SV_{oil}$ according to the corresponding protocol as specified in the examples section.

Common anti-spattering agents for use in cooking fat products comprise emulsifiers in a broad sense e.g. lecithin, hydrolysed lecithin, esters of citric acid and alcohols (Citrem™) and cooking salt. Only lecithin and cooking salt are natural, but the effect of lecithin on spattering is limited. Lecithin, moreover, has the disadvantage that it may decompose at high frying temperatures and causes bad smell, discoloration and foaming. Cooking salt (sodium chloride) has to be added in a substantial amount for showing an effect.

U.S. Pat. No. 4,399,165 discloses an edible oil composition suitable for frying applications, comprising a liquid oil, an emulsifier, a browning substance and an effective amount of a stabilising material. Suitable emulsifiers mentioned in this document include monoglycerides, lecithins, citric acid esters, tartaric acid esters, lactic acid esters and mixtures thereof.

The examples in U.S. Pat. No. 4,399,165 show that products comprising soy lecithin exhibit only limited spattering when beef was fried.

Patents EP 477825 and EP 771531 disclose the use of citric acid esters for improving spattering behaviour.

U.S. Pat. No. 3,946,122 and U.S. Pat. No. 5,436,021 disclose water and oil emulsions comprising a citric acid ester of a mono- or diglyceride of fatty acids for improving spattering behaviour.

WO 01/84945 mentions the use of a citric ester of a partial fatty acid glyceride for improving spattering behaviour.

A relatively high salt content is typical for most prior art cooking oils which show an improved spattering behaviour. EP 775444 discloses a pourable fat containing composition comprising herbs, spices, nuts or seeds and 1-10 wt. % of salt.

The present invention provides a method for improving the spattering behaviour of a cooking fat product using ingredients which are cheap, natural and highly effective.

SUMMARY OF THE INVENTION

The invented method consists in the use of powdered vegetable matter for improving spattering behaviour as defined in claim 1.

DETAILS OF THE INVENTION

We have found a method for improving the spattering behaviour of a cooking fat product containing 0-5 wt. % of a dispersed aqueous phase which comprises the steps a. selecting a cooking fat product containing 0-5 wt. % of a dispersed aqueous phase,
b. selecting fat insoluble vegetable matter having a consistency which allows milling to a powder,
c. milling the vegetable matter to a powder having an average particle size $d_{4,3}$ selected from the range 1-2000 μm,
d. admixing the resulting powder to the cooking fat product in an amount of 0.1-25 wt. % on product and getting it evenly dispersed throughout the product.

The cooking fat product usually is an oil. Any cooking oil which is commonly used for shallow frying may be selected such as olive oil, soybean oil, rapeseed oil, palm oil, sunflower oil, corn oil, safflower oil, cotton seed oil, palmkernel oil, coconut oil, linseed oil, lauric oils, butter or fractions thereof and mixtures of these oils. The cooking fat product also may be a fat which is solid at ambient temperature, but which liquefies in the heated frying pan.

The cooking fat product optionally comprises a small amount, usually 0.5-5 wt. %, of a structuring fat which serves to impart dispersion stability to the final product. Structuring fats are well known from e.g. liquid and plastic margarines and comprise e.g. hydrogenated high erucic rapeseed oil, which is particularly preferred because it is able to keep particles stably dispersed in liquid oil. Other suitable structuring fats comprise, for example, hydrogenated fish oil, hydrogenated ground nut oil, hydrogenated sunflower oil and also solid non-hydrogenated fats, and mixtures of those fats.

It may appear to be expedient to disperse the powdered material into the cooking fat product as a slurry with water. The amount of water should not exceed such amount that the final product contains more than 5 wt. % of dispersed aqueous phase.

If the cooking fat product has a solid consistency, it should be liquefied before mixing with the powder.

The vegetable matter selected for milling consists of one or more substances which are selected preferably from the groups consisting of fruits (e.g. olives), nuts (e.g. almond, walnut, cashew nut, ground nut, pine tree nut), seeds (e.g. sunflower seed, linseed), beans (e.g. soybeans), kernels and pits (e.g. olive kernels) and also pectin, alginate and cellulose and, of course, mixtures of said substances. However, many more substances are effective as well, which is apparent from Table I.

The volume weighted mean diameter ($d_{4,3}$) of the powder particles, which size best approximates the modal diameter, is selected from the range 1-2000 μm, preferably from the range 1-700 μm, more preferably from the range 1-100 μm and still more preferably 1-40 μm. For measuring volume weighted mean diameter suitably a Malvern Mastersizer S device is used following the corresponding measuring protocol.

Without wishing to be bound by theory, it is believed that the milling treatment changes the outer structure of the particulate vegetable matter such that the transformation of water into steam is controlled in such way that spattering is reduced because explosive outbursts of steam are prevented or at least reduced.

For milling the selected soft to medium-hard and fibrous vegetable matter a Retsch ZM100 ultracentrifugal mill is especially suitable. Generally, a sieve with an aperture size of 0.2 mm is suitable.

The vegetable matter selected for milling is said to be fat insoluble. This means that at least 50 wt. %, preferably at least 65 wt. %, more preferably at least 80 wt. %, still more preferably at least 95 wt. % of the vegetable matter is fat insoluble.

When the fat amount of the selected vegetable matter causes milling difficulties, the milling step is preceded by a defatting treatment. Common extraction with solvent, e.g.

hexane or liquified carbon dioxide, preferably after coarsely crushing or milling the vegetable matter, gives a satisfactory result. Defatting may appear to be less necessary for substances having a low fat content.

Nevertheless fat extraction may contribute to improve the eventual spattering behaviour of the obtained cooking fat product.

Besides defatting also drying is an optional pre-treatment for making the selected vegetable matter more suitable as an ingredient for the invention. Olive particles are used preferably after freeze drying.

Optionally, the cooking fat product comprises other ingredients such as lecithin, a colouring agent, one or more flavour components or salt. Lecithin, when present, is added up to 0.5 wt. %. For reasons mentioned above the cooking fat product used for the present invention preferably is substantially free from lecithin, hydrolysed lecithin and cooking salt. Keeping the salt content low is preferred from a nutritional point of view.

The powder resulting from the milling is dispersed into the oil in an amount which is selected from the range 0.1-25 wt. %, preferably 0.1-10 wt. %, more preferably 0.1-5 wt. %, still more preferably 0.1-1.0 wt. %.

According to a particular embodiment the higher powder concentrations are used preferably in a cooking fat product which is solid at ambient temperatures. Such product is used preferably in a small amount in combination with a common cooking oil. When heated in a frying pan the fat melts, blends with the cooking oil and so exhibits its anti-spattering quality. Fats with a high powder concentration are offered for sale preferably in portion pack format and so serve as easily applicable anti-spattering kitchen aids.

Particularly preferred for use in the present invention is the powder obtained by milling the kernels of olives and seeds or beans, preferably sunflower seeds, linseed and soybeans, optionally milled after a defatting treatment. For unknown reasons these powders exhibit extraordinarily high $SV_{oil}$ values.

Another group of substances which are preferably used for the invented method consists of cellulose, pectin and alginate.

Cooking fat products resulting from the invention show a strongly improved spattering behaviour characterised by a $SV_{oil}$ value being at least 4. For some cooking fat products $SV_{oil}$ values exceeding 7 and even 8 are attained, which is a quality not yet shown for a cooking oil.

The concentrations mentioned in this specification are weight concentrations on total product unless indicated otherwise.

General Method for Determining Spattering Value

The spattering behaviour of cooking products according to the invention is evaluated after storage of the prepared product for at least 1 day at room temperature. Before testing, liquid samples are well shaken to make them homogeneous.

For assessment of spattering values ($SV_{oil}$) 21 g of test sample (0.5 wt. % of powder dispersed in refined sunflower oil) is heated in a shallow glass dish on an electric plate set at about 205° C.

Spattering is assessed by pouring a small amount, 0.5 ml of water into the heated fat product. The fat droplets spattering out of the dish are captured on a sheet of paper fixed above the dish at a distance of 25 cm.

The speckled image of the obtained test paper is compared with a standard set of reference sheets numbered 0, 2, 4, 6, 8, 10. The number of the best resembling sheet is recorded as actual spattering value. Ten indicates no spattering at all and zero indicates very heavy spattering. The other scoring figures correspond with spattering behaviour as follows:

| $SV_{oil}$ score | Spattering Behaviour |
|---|---|
| 10 | excellent, no spattering |
| 8 | good |
| 6 | just good |
| 4 | poor |
| 2 | heavy spattering |
| 0 | very heavy spattering |

$SV_{oil}$ scores of plain vegetable oils usually are 0 and do not exceed 2.

The mean size of the particles resulting from the milling process is critical for their spattering reducing quality. For size comparison of various samples the volume weighted mean diameter ($d_{4,3}$) is measured. This diameter is close to the modal diameter. The volume weighted mean diameter suitably is measured in a Malvern Mastersizer S, a gauge based on laser light scattering. The apparatus is filled with the refined sunflower oil. Powdered material is added until 20% obscuration (80% of original maximal signal) is reached (about 0.5 g added), whereafter actual measurement is started. For calculation of the value of $d_{4,3}$ the Mie theory is used with the following parameters/values:

Solvent refractive index 1.4694; Particle refractive index, Real part: 1.5300; Particle refractive index, Imaginary part: 0.1.

The following examples illustrate the invention.

EXAMPLES

Fully refined (nbd) sunflower oil was selected as cooking oil. Vegetable matter as exemplified in Table I was milled in a Retsch ZM100 ultra centrifugal mill, which mill is especially suited for grinding soft to medium-hard and fibrous materials.

In general the aperture size of the mill's sieve was 0.2 mm. Where indicated, a different sieve size was applied. After milling the powder was added to the oil in an amount of 0.5 wt. %.

Where indicated, the vegetable matter was defatted prior to milling by a standard extraction process in a Soxhlet device using hexane as solvent. Before extraction the vegetable matter was coarsely crushed. Residue solvent was removed in a rotary evaporator.

Particularly with olive kernels it can be seen, that the $SV_{oil}$ value improves when the particle size ($d_{4,3}$) of the used powder decreases.

TABLE I

| Vegetable Matter | Sieve size (mm) (2) | (1) | Powder size (μm) (3) | $SV_{oil}$ |
|---|---|---|---|---|
| Olive kernels | 0.08 | | 72 (58) | 7 |
| Olive kernels | 0.2 | | 94 (74) | 5 |
| Olive kernels | 1 | | 332 (90) | 2-2.5 |
| Rice | 0.2 | | 100 | 7.5 |
| Lasagna leaves | 0.2 | | 56 | 6.5 |
| Nutmeg powder | n.d. | | 164 | 6.5-7 |
| Thyme powder | n.d. | | 142 | 6.5-7 |
| Brown beans | 0.2 | | 64 (43) | 6.5-7 |
| Green beans | 0.2 | | 96 (48) | 6-6.5 |
| Soybeans | n.d. | | 56 | 8 |
| Linseed | 0.2 | x | 66 | 8 |
| Pine tree nuts | 0.2 | x | 38 | 7.5 |
| Sunflower seed | 0.2 | x | 32 | 8.5 |
| Sunflower seed | 1 | x | 82 | 8.5 |
| Abricot nuts | 0.2 | | 68 | 6 |
| Tapioca starch | n.d. | | 31 | 7-7.5 |
| Cellulose | n.d. | | 203 | 6-6.5 |
| Comparison | | | | |

TABLE I-continued

| Vegetable Matter | Sieve size (mm) (2) | (1) | Powder size (µm) (3) | $SV_{oil}$ |
|---|---|---|---|---|
| No addition | | | | 1 |

(1) Prior hexane extraction? x: yes
(2) Aperture size of the mill's sieve; n.d.: non determined
(3) Volume weighted mean diameter ($d_{4,3}$) of the powder, analysed with a Malvern Mastersizer S device

The invention claimed is:

1. Method for improving the spattering behaviour of a cooking fat product containing 0-5 wt. % of a dispersed aqueous phase comprising the steps
   a) selecting a cooking fat product containing 0-5 wt. % of a dispersed aqueous phase,
   b) selecting fat insoluble vegetable matter having a consistency which allows milling to a powder,
   c) milling the vegetable matter to a powder having a volume weighted mean particle diameter ($d_{4,3}$) selected from the range 1-2000 µm,
   d) admixing the resulting powder to the cooking fat product in an amount of 0.1-25 wt. % on product and getting it evenly dispersed throughout the product.

2. Method according to claim 1, characterized in that the vegetable matter consists of one or more substances selected from the group consisting of fruits, nuts, seeds, beans, kernels, pits and cellulose.

3. Method according to claim 1, characterized in that the volume weighted mean particle diameter ($d_{4,3}$) of the powder particles is selected from the range 1-700 µm.

4. Method according to claim 1, characterized in that the powder is admixed to the cooking fat product in an amount which is selected from the range 0.1-25 wt. %.

5. Method according to claim 1, characterized in that the powder to be admixed consists of milled kernels of olives.

6. Method according to claim 1, characterized in that the powder to be admixed consists of milled sunflower seeds or milled linseeds or a mixture of these.

7. Method according to claim 1, characterized in that the powder to be admixed consists of milled soybeans.

8. Method according to claim 1, characterized in that the powder to be admixed consists of milled nuts selected from the group consisting of pine tree nuts, almonds, ground nuts, walnuts and cashew nuts or a mixture of these.

9. Method according to claim 1, characterized in that the powder to be admixed consists of powdered cellulose, pectin and alginate or a mixture of these.

10. Method according to claim 1, characterized in that the resulting cooking fat product shows a spattering behaviour characterized by a SVoil value being at least 4.

11. Method according to claim 1, characterized in that the volume weighted mean particle diameter ($d_{4,3}$) of the powder particles is selected from the range 1-40 µm.

12. Method according to claim 1, characterized in that the powder is admixed to the cooking fat product in an amount which is selected from the range 0.1-1 wt. %.

* * * * *